Oct. 25, 1932.  J. R. McWANE.  1,884,064
PIPE JOINT
Filed Feb. 27, 1930   3 Sheets-Sheet 1
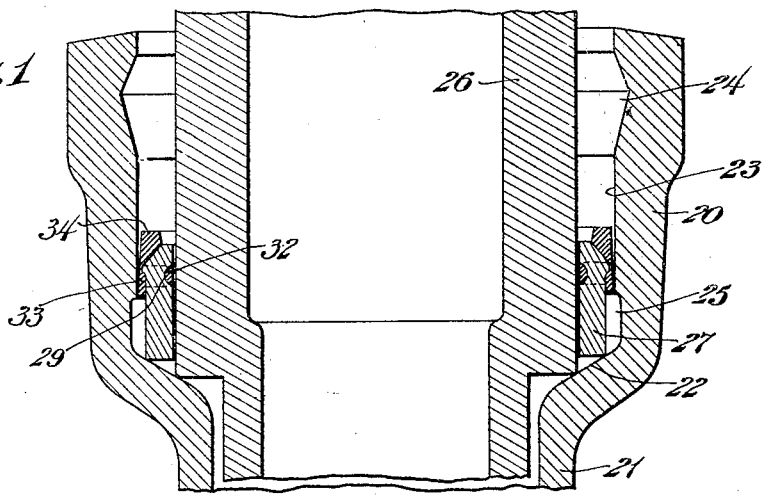
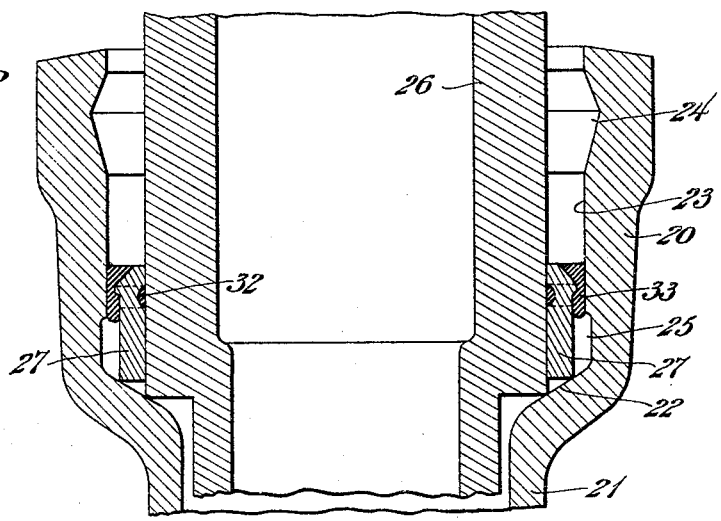
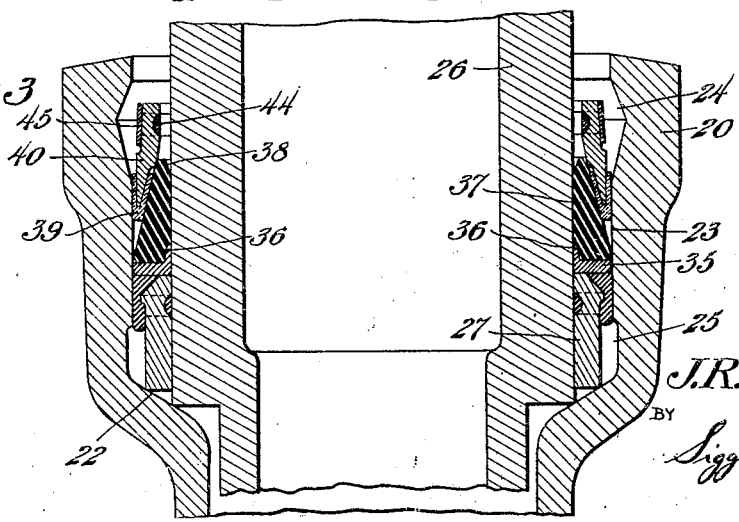
INVENTOR
J. R. McWane
BY
Siggers & Adams
ATTORNEYS

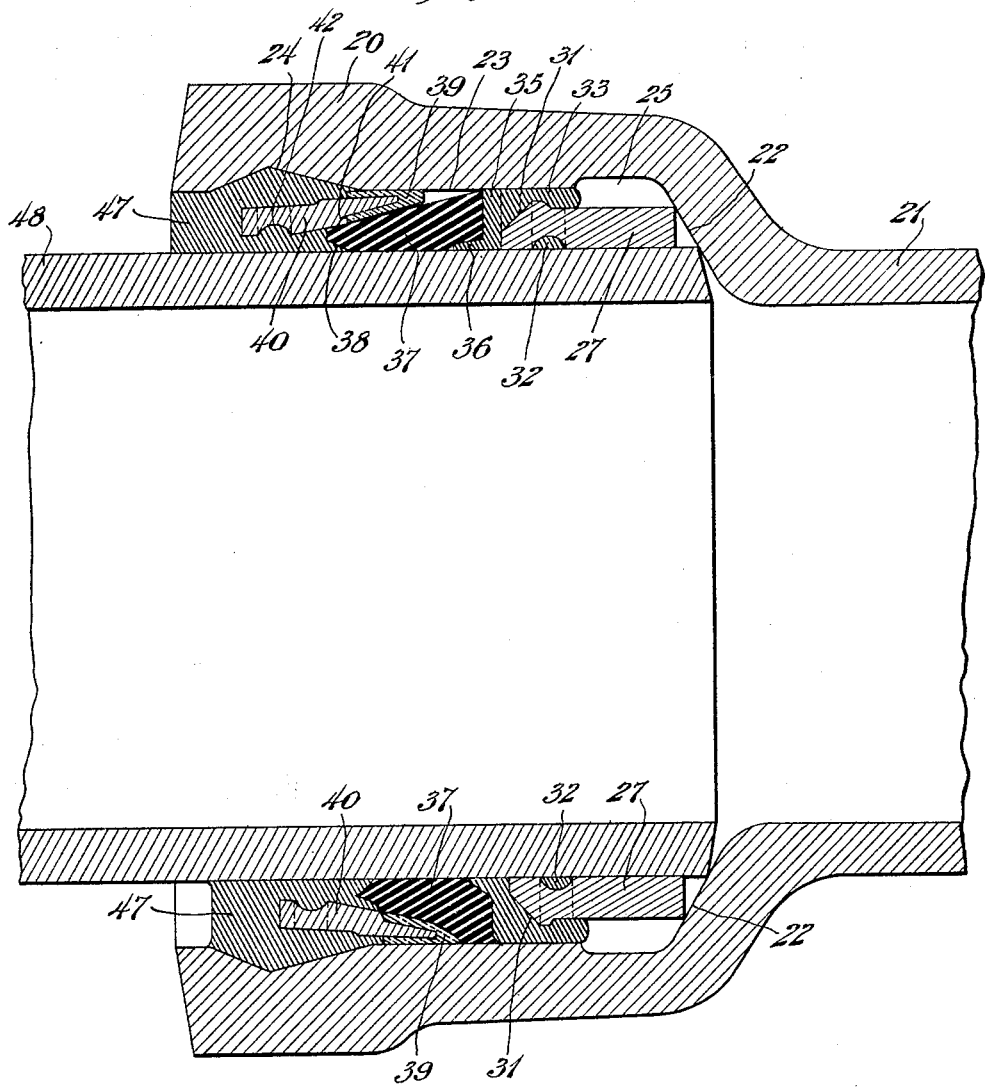

Oct. 25, 1932.  J. R. McWANE  1,884,064
PIPE JOINT
Filed Feb. 27, 1930   3 Sheets-Sheet 3

INVENTOR
J. R. McWane
BY
Siggers & Adams
ATTORNEYS

Patented Oct. 25, 1932

1,884,064

UNITED STATES PATENT OFFICE

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA

PIPE JOINT

Application filed February 27, 1930. Serial No. 431,860.

This invention relates to pipe joints of the bell and spigot type and, among other objects, aims to provide an improved joint particularly useful in gas lines and composed of materials which may be prepared and assembled in the pipe bells by the pipe manufacturer. Another aim is to provide a joint of this character which will hold gas under high pressure without leakage and, at the same time, permit relative movement of the pipe sections either laterally or longitudinally without destroying the seal.

The present invention is an improvement on the invention described and claimed in my pending application, Ser. No. 341,406, filed February 20, 1929.

In the accompanying drawings:

Figs. 1, 2 and 3 are central sectional views through the bell of a pipe section showing some of the preferred joint materials in different stages of assembly within the calking space or joint room;

Fig. 4 is a central sectional view of a bell and spigot showing all of the joint materials inserted at one side and calked at the other;

Figure 5:
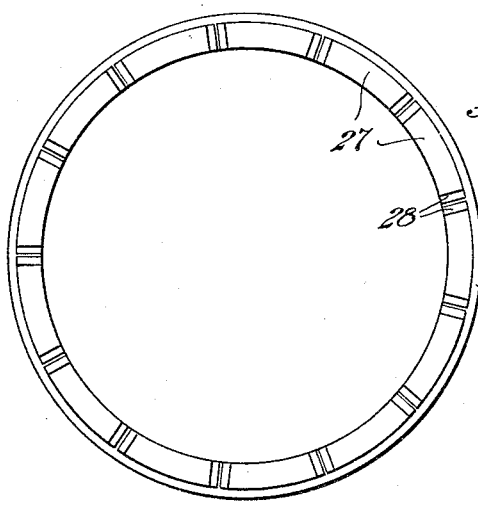
Fig. 5 is a lower end view of a ring of assembled blocks constituting a part of the joint material.

Referring particularly to the drawings, the joint materials are shown as being assembled in the bell 20 of a section 21 of cast iron pipe. The bell, in this instance, presents an inwardly beveled or inclined annular shoulder or seat 22 at its base, an intermediate cylindrical machined surface 23 and a lead groove 24 near the mouth. The internal diameter of the bell near the base is somewhat larger than the cylindrical portion to provide a tool clearance space 25.

The joint materials are adapted to be assembled in the joint space about a cylindrical mandrel 26 seated in the base of the bell while the pipe section is supported upright, as shown. This mandrel is of slightly larger diameter than a spigot so as to allow adequate clearance for the insertion of the spigot when the joint is to be finally calked in the field.

Instead of providing a primary sealing ring of calked lead at the base of the bell, as shown in my aforesaid application, an assembled, substantially cylindrical ring of specially shaped metal blocks 27, flexibly connected at one end, are seated endwise directly against the shoulder 22 so that they provide solidly supported anvils against which lead is subsequently calked. As shown in Figs. 1 to 4, the blocks project upwardly above the clearance space 25 into the lower or inner part of the machined portion 23 and a primary lead seal, hereinafter described, is calked about the upper ends.

Figure 6:
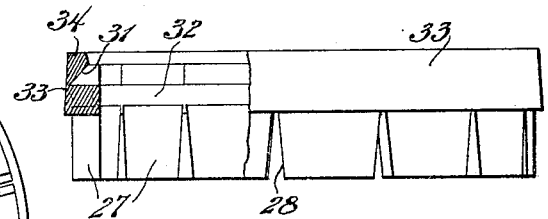
Fig. 6 is a side elevation, partly in section, of the assembled ring of blocks shown in Fig. 5.
Figure 7:
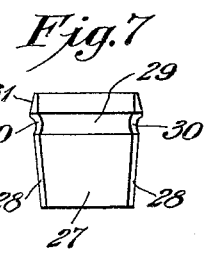
Fig. 7 is a side elevation of one of the blocks.

Referring to Figs. 5, 6 and 7, the blocks are arcuate in cross-section instead of being flat as shown in my Patent No. 1,270,309, the idea being to make them conform substantially to the curvature of the spigot and provide a better seal. The lower ends are tapered, having beveled or downwardly converging side edges 28, (Fig. 7) so as to permit them to be squeezed together or contract radially inwardly against the spigot. If the lower edges were straight and in contact with each other, this could not be done. The inner faces of the blocks have transverse, arcuate grooves 29 and their edges, at the ends of the grooves, have notches 30 so as to provide gates for molten lead to run into the grooves. The upper ends of the blocks are beveled so as to present inclined outer faces 31 against which lead is adapted to be calked to wedge the inner faces firmly against the mandrel and, subsequently, against the spigot. See Fig. 2. All of the blocks for a ring are assembled upside down in a lead mold (not shown) into which molten lead is poured, the broad idea being disclosed in my pending application, Ser. No. 167,509, filed February 11, 1927. However, in this example, the molten lead runs from the outer portion of the ring through the slots or gate openings 30 producing an inner ring of lead 32. Also, an outer band or ring of lead 33 is molded on the outer sides and inclined faces 31 of the blocks, presenting an annular extension or flange 34 of excess lead projecting beyond (above) the ends of the blocks. The outer and inner rings are united by the frozen lead in the gates so that all of the blocks are firmly, though flexibly, held assembled. The idea of providing the annular extension 34 of excess lead on the lead ring is to permit pre-calking thereof against the inclined faces 31 of the blocks and wedge the blocks radially inwardly against the mandrel. Compare Figs. 1 and 2, showing this radial inward movement of the blocks.

Referring back to Figs. 1 and 2, the next step in the assembling operation is to calk the ring or the extension 34 on the upper ends of the blocks so as to drive this lead inwardly or downwardly approximately to the level of the upper ends of the blocks. This calking serves not only to drive the blocks downwardly against the inclined shoulder 22 of the bell, squeezing their lower ends against the mandrel, but, also, wedges the upper ends inwardly, holding them against the mandrel. The most important function of this calked lead is to provide a seal on the bell side or outside of the blocks which will positively prevent escape of gas or condensates to damage or destroy the flexible packing, hereinafter described.

After the excess lead is calked around the upper tapered ends of the blocks, as shown in Fig. 2, a cast ring of lead 35 presenting a vertical annular flange 36 is inserted so that it rests against the upper or outer ends of the blocks and the calked lead around them and the flange 36 surrounds the mandrel, (Fig. 3). In this instance, the cast lead ring is initially substantially L-shaped in cross-section. The purpose of this ring is two-fold. First, it provides additional calking lead which, when finally calked, wedges the blocks against a spigot, and also, a lead seal against the spigot positively to prevent gas or condensates from escaping between it and the spigot, thus completing what may be termed a primary seal. Second, the outer or upper surface of the ring and the flange 36 provide a smooth seat for a flexible packing, about to be described.

Figure 12:
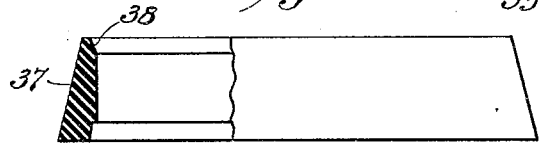
Fig. 12 is a side elevation, partly in section, of a rubber gasket constituting a flexible sealing element for the joint.
Figure 13:
Fig. 13 is a side elevation, partly in section, showing a V-shaped rubber ring adapted to co-operate with the rubber gasket shown in Fig. 12.

In Fig. 3 and the upper part of Fig. 4, there is shown a specially shaped, yieldable and resilient packing in the form of a rubber packing ring or gasket 37 which is generally triangular or wedge-shaped in cross-section, the outer wall or face being frusto-conical and leaving a V-shaped space between it and the bell; while the inner surface is cylindrical and contacts with the mandrel. The base of the gasket is seated against the radial flange of the ring 35 and the inner wall presents an annular channel (Fig. 12) to accommodate or fit the flange 36. Thus, the gasket is locked in place and prevented from bulging radially inwardly to be fouled when a spigot is inserted. The inner edge of the gasket at the upper or outer end presents an outwardly beveled or flared face 38 so as to provide a shallow V-shaped space to receive poured calking lead and thereby prevent the exposure of a feather edge to be fouled upon the insertion of a spigot.

Again referring to Figs. 3 and 4, the wedge-shaped rubber gasket is adapted to be wedged inwardly against a spigot by means of a co-operating wedge ring 39 preferably made of rubber and shown as being V-shaped in cross-section. As shown, the outside wing of this rubber ring is adapted to contact with the bell and the inner wing is shaped to conform to and wedge against the frusto-conical outer surface of the gasket 37. It is adapted to be driven inwardly in the V-shaped space between the gasket and the bell and slide against the outer wall of the gasket upon final calking, providing a deformable seal between the gasket and the smooth inner surface of the bell.

Figure 8:
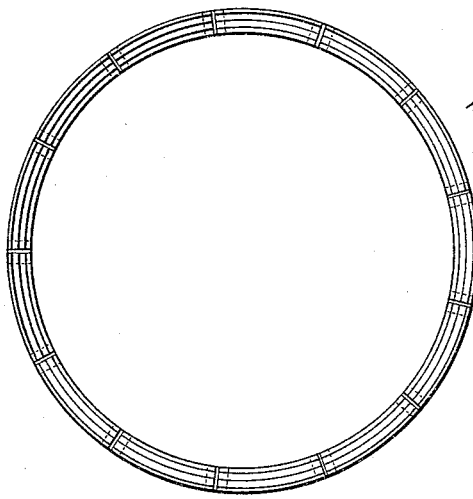
Fig. 8 is a plan view of a ring of wedges also constituting a part of the joint materials.
Figure 9:
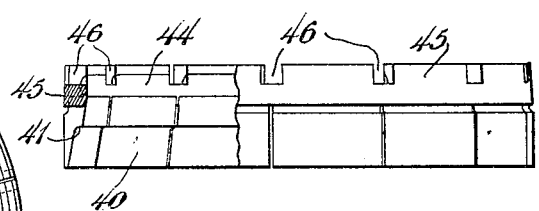
Fig. 9 is a side elevation, partly in section, of the ring of wedges shown in Fig. 8.
Figure 10:
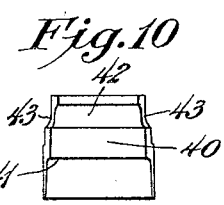
Fig. 10 is a side elevation of one of the wedges.
Figure 11:
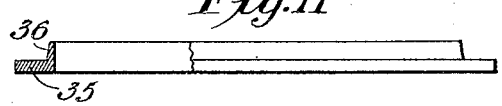
Fig. 11 is a side elevation, partly in section, of a cast lead ring also constituting a part of the joint material.

The V-shaped gasket or ring, before it is inserted in the bell, is mounted on the wedge-shaped ends of an assembled ring of specially shaped metal wedges 40 (Figs. 8 and 9). Herein, the wedges are arcuate so as to conform to the outer surface of the rubber gasket and exert uniform pressure against and all around its periphery. The outer faces of the wedges, at their lower or inner ends are beveled or tapered and present transverse shoulders 41 which co-operate to provide an annular abutment or stop flange for the outer end of the inner wing of the V-shaped wedging gasket 39 (see the lower half of Fig. 4).

Like the lower ring of blocks, the inner faces of the wedges present transverse arcuate lead-receiving grooves 42 near their outer or upper ends. They also have notches 43 in their opposite edges which, in this example, extend to the upper or outer ends and co-operate to provide gates through which molten lead may flow when poured in a mold (not shown) wherein the wedges are placed upside down. These complemental open notches are also adapted to straddle upstanding pins in the mold to space the wedges uniformly and form the closed ring. The molten lead is poured into the mold, flows through the notches above the spacer pins into the grooves 42, forming an inner ring 44 and also an outer ring 45 around the upper or outer faces of the wedges. These two rings of lead are also connected by the frozen lead in the gates or notches so as to hold the wedges together and prevent them from falling out before they are inserted. The outer faces of the wedges are preferably offset so that the outer ring of lead comes about flush with the bottom portion of their faces whereby this ring of lead does not increase the overall thickness at the upper end of the ring.

In Fig. 9, it will be noted that the upper end of the assembled ring of wedges has spaced notches 46 in the lead holding ring. These notches are the prints of the spacer blocks or pins in the lead mold (not shown) and are of less depth than the notches 43, although they extend into the inner lead ring 44. Now, since the upper or outer ends of the wedges project into the calking space near the mouth of the bell—sometimes into the outer restricted portion of the lead groove 24—the notches provide a series of gates through which molten calking lead may flow and completely fill the spaces outside and inside of the ring of wedges, the diameter of the ring at this end being made larger than the mandrel and smaller than the bell.

To complete the pre-forming operation, molten lead 47 is poured in the mouth of the bell preferably completely filling it on both sides of the wedges and flowing into the small V-shaped space between the outer end of the rubber packing ring 37 and the mandrel (Fig. 4) forming a retaining fin for the outer end of the packing ring. This provides a lead ring which is ready to be calked in the field after a smooth or machined spigot 48 is inserted, as shown in Fig. 4. The annular fin at the inner end of this ring of calking lead positively prevents the outer end of the rubber packing ring or gasket 37 from being displaced inwardly in the way of the spigot before the spigot is inserted.

The lower half of Fig. 4 shows the effect of calking the joint in the field. As the calking lead is driven inwardly, the wedges 40 are driven by it, wedging the V-shaped gasket against the rubber packing ring 37 and forcing it inwardly. At the same time, great endwise or inward pressure is applied to the rubber packing by the lead and is transmitted to the ring of sealing lead 35, including the calked lead ring around the outer ends of the blocks 27. All of the lead constituting the primary seal is swaged or distorted and expanded against the tapered ends of the blocks 27 into good sealing contact with the bell and the spigot, the tapered ends of the blocks all presenting fixed anvils against which this swaging is made most effective. It will be observed that the rubber packing is now completely sealed between a primary or inner sealing ring of calked lead and an outer lead sealing ring which prevent any exposure of the rubber to gas or condensate thereof from within the pipe or to air from the outside. Moreover, the pipe sections move relative to each other due to expansion and contraction without destroying either seal. This is due largely to the fact that the compressed rubber always exerts sealing pressure against the spigot and also squeezes adjacent parts of the calked lead into gripping contact with the spigot.

While the preferred embodiment of the joint has been described as being adapted for use in gas mains or pipes, it will be apparent that it is capable of other uses. In fact, the term "gas" as used herein is intended to apply generically to artificial and natural gases including air.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:

1. A bell and spigot pipe joint comprising, in combination, a ring of blocks flexibly connected together by a ring of lead and abutting the bottom of the bell at their free ends; another ring of lead tightly compressed against the first ring, the two rings together being in sealing contact with the bell and spigot and forming a primary seal; a rubber ring in contact with said mass of lead and with the bell and spigot, said second lead ring having a shape to expand the rubber ring against the bell when said rubber ring is compressed against said second ring; and lead calked into the mouth of the bell and engaging said rubber ring to compress the same both inwardly against the primary sealing lead and laterally against the bell and spigot.

2. A bell and spigot pipe joint comprising in combination, an assembled, substantially cylindrical ring of blocks seated at their inner ends against the base of the bell and constituting rigid anvils, each presenting a wedge-shaped outer end; calking lead cast about the outer ends of the blocks initially holding them assembled and pre-calked against the bell; a ring of lead seated against the pre-calked lead and the outer ends of said blocks presenting a flange adjacent to the spigot and co-operating with the pre-calked lead to provide a primary seal; a rubber packing ring seated against said lead ring; and a ring of calked lead in the mouth of the bell compressing said packing ring against the spigot and also swaging said sealing ring of lead against the spigot.

3. A bell and spigot pipe joint comprising, in combination, an assembled, substanbell; beveled faces on the outside of the blocks at their outer ends; a cast ring of lead formed about the beveled faces of the blocks initially to hold them assembled and calked between said faces and the bell; an L-shaped lead ring seated on the outer ends of the blocks and having one flange to contact an inserted spigot; a wedge-shaped rubber packing ring having a base shaped to conform to and fitting against said L-shaped lead ring and its flange; said rubber packing presenting a substantially cylindrical inner wall and having an outwardly flared outer end portion; calking lead poured into the mouth of the bell and imbedding said flared end portion of the rubber ring; and a ring of wedges also imbedded in said calking lead adapted to be driven endwise between the outer face of said rubber packing and the bell to wedge it against an inserted spigot.

10. In a pipe bell, a pre-formed packing comprising, in combination, a ring of arcuate metal blocks in the bottom portion of the bell; beveled faces on the outside of the blocks at their outer ends; a cast ring of lead formed about the beveled faces of the blocks initially to hold them assembled and calked between said faces and the bell; an L-shaped lead ring seated on the outer ends of the blocks and having one flange to contact with an inserted spigot; a wedge-shaped rubber packing ring having a base shaped to conform to and fitting against said L-shaped lead ring and its flange; said rubber packing presenting a substantially cylindrical inner wall and having an outwardly flared outer end portion; calking lead poured into the mouth of the bell and imbedding said flared end portion of the rubber ring; a ring of metal wedges imbedded in the calking lead presenting offset shoulders across their inner faces; and a V-shaped rubber ring fitted on the inner ends of said wedges and having an inner wing adapted to be seated against said shoulders when the wedges are driven inwardly.

11. In a pipe bell, a pre-formed joint packing comprising, in combination, a ring of blocks at the inner end of the bell; a metallic packing ring about the outer ends of said blocks; an intermediate rubber packing ring seated on and interlocked with said metallic packing ring; and a ring of calking lead in the mouth of the bell imbedding and interlocked with the outer end of said rubber packing ring, said rubber ring being interlocked with the metallic packing ring and the ring of calking lead at the opposite ends, so that fouling of the spigot on said ends is obviated.

12. As an article of manufacture, a substantially cylindrical ring of arcuate, elongated blocks adapted to be inserted in a pipe bell to provide joint material, each block having a beveled outside face at one end; and a cast ring of calking lead formed on the beveled faces having a flange of excess lead projecting beyond the end of the ring of blocks to permit preliminary calking between said beveled faces and the bell, whereby to wedge the blocks against a spigot and also provide a seal between the blocks and the bell.

13. As an article of manufacture, a substantially cylindrical ring of elongated blocks adapted to be inserted in a pipe bell to provide joint material, each block having a beveled outside face at one end; and a cast ring of calking lead formed on the beveled faces and about the blocks initially to hold them assembled, said cast ring being of sufficient width and mass to form a primary seal within the pipe bell, when the joint is calked.

14. As an article of manufacture, a ring of slightly spaced, elongated, metal blocks adapted to be inserted in a pipe bell to provide joint material, each block having a beveled outside face at one end and a transverse groove in the inside face so formed that all of the grooves provide an annular channel on the inside of the ring; and cast rings of calking lead formed on said beveled faces and in said grooves initially to hold the blocks assembled.

15. As an article of manufacture, a ring of slightly spaced, elongated, metal blocks adapted to be inserted in a pipe bell to provide joint material, each block having a beveled outside face at one end and a transverse groove in the inside face so formed that all of the grooves provide an annular channel on the inside of the ring; and cast rings of calking lead formed on said beveled faces and in said grooves initially to hold the blocks assembled, all of the blocks having notches in their edges through which molten lead flows from one side of the blocks to the other and in which lead is frozen to connect the lead rings.

16. A flexible, compressible packing for bell and spigot joints comprising a rubber ring substantially triangular in cross-section having a substantially cylindrical inner surface and an outwardly flared face at the thin edge portion, whereby the tapered edge may be imbedded in a ring of poured molten lead to prevent fouling upon the insertion of a spigot.

17. A flexible, compressible packing for bell and spigot joints comprising a rubber ring generally triangular in cross-section and having a substantially cylindrical inner surface and an outwardly flared face at the thin edge portion, and also having an annular channel in the cylindrical face at the inner end.

18. As an article of manufacture, a ring of elongated, arcuate metal wedges constituting a packing gland for bell and spigot joints, each of said wedges presenting a tapered end and an offset transverse shoulder; complemental notches at the other end edges of the wedges; transverse grooves in the inside faces of the wedges near the bottoms of said notches constituting pouring gates for molten lead to flow from the outside of the ring into said grooves; and rings of lead formed on wedges and in said grooves, said notches being only partially filled with frozen lead to provide spaced gateways through which molten lead may flow to either side of the ring when it is inserted in a pipe bell.

19. In a pipe bell, a pre-formed joint packing comprising, in combination, a metallic packing ring; a rubber packing ring seated on and mechanically interlocked with said metallic packing ring; and calking lead in the mouth of the bell imbedding and interlocked with the outer end of said rubber packing ring, both ends of the rubber packing ring being held by the aforesaid rings so that a spigot may be inserted into the bell having the preformed joint packing therein without fouling on the rubber packing.

In testimony, that I claim the foregoing as my own, I have hereto affixed my signature.

JAMES R. McWANE.